(12) United States Patent
Robinson

(10) Patent No.: US 6,685,237 B1
(45) Date of Patent: Feb. 3, 2004

(54) TORQUE RESISTANT RETROFIT FOR COMPRESSION METAL FACE SEALS

(76) Inventor: Eric Robinson, 15044 Chelsa Dr., San Jose, CA (US) 95124

( * ) Notice: Subject to any disclaimer, the term of this patent is extended or adjusted under 35 U.S.C. 154(b) by 0 days.

(21) Appl. No.: 10/305,794

(22) Filed: Nov. 27, 2002

(51) Int. Cl.[7] ................................................ F16L 35/00
(52) U.S. Cl. .................... 285/330; 285/913; 285/354; 285/917; 285/357
(58) Field of Search ................................ 285/913, 914, 285/330, 354, 379, 393, 917, 357, 328

(56) References Cited

U.S. PATENT DOCUMENTS

| | | | | |
|---|---|---|---|---|
| 3,756,628 A | * | 9/1973 | St. Clair | 285/328 |
| 4,685,707 A | * | 8/1987 | Miyashita | 285/328 |
| 5,054,822 A | | 10/1991 | McGushion | |
| 5,058,935 A | * | 10/1991 | Eidsmore | 285/330 |
| 5,060,987 A | * | 10/1991 | Miller | 285/328 |
| 5,066,051 A | * | 11/1991 | Weigl et al. | 285/328 |
| 5,299,843 A | * | 4/1994 | Weigl et al. | 285/328 |
| 5,306,052 A | | 4/1994 | McGushion | |
| 5,829,796 A | | 11/1998 | Robinson | |
| 6,145,888 A | * | 11/2000 | Ohmi et al. | 285/917 |
| 6,170,890 B1 | * | 1/2001 | Ohmi et al. | 285/379 |
| 6,382,683 B1 | * | 5/2002 | Albright et al. | 285/330 |

* cited by examiner

Primary Examiner—David Bochna
(74) Attorney, Agent, or Firm—Donald D. Mon

(57) ABSTRACT

A retrofit fitting for an externally threaded male nut that carries a face seal. The fitting is an adaptor with an internal thread to be threaded onto the male nut and an external thread to receive a female nut. The fitting carries a plurality of blades that engage matching blades on a cage engaged by the female nut. The cage is compressed against a head that bears the face seal by the female nut, so that relative rotation between the heads and face seals is prevented.

8 Claims, 2 Drawing Sheets

TORQUE RESISTANT RETROFIT FOR COMPRESSION METAL FACE SEALS

FIELD OF THE INVENTION

A retrofit device to resist torque while a compression metal face seal is tightened.

BACKGROUND OF THE INVENTION

Metal face seals are widely used in critical piping areas where utmost purity and protection of the confined gases, and security against leakage of what are often extremely toxic gases are critical. Essentially these face seals involve pressing a circular metal ring-shaped face seal against a metal gasket. They are compressed against and slightly indented into the contiguous gasket surface, by tightening a female internally threaded nut onto an externally threaded male nut. Shoulders on the nuts press the face seals (or more specifically the heads which bear the face seals) against the gasket when the nuts are tightened.

So long as the face seals experience only axial compressive forces, the face seals will simply engage and detent somewhat into the gasket. The very accurate shape and fine finish of the face seals are not damaged.

However, should there be a twisting movement of one relative to the other while they are being pressed against a contiguous surface, and especially if that surface is the other face seal, the face seals can be damaged, often so badly that they could leak, and they must then be replaced. Replacement in installations such as are used in semiconductor manufacture can be very costly both in labor and equipment, and in down time for the apparatus. Unless precautions are taken, such twisting movement can be caused by the nuts, when one engages a respective head and rotates the heads and face seals relative to the other, even slightly.

This is not a new problem. Three previous patents have addressed the same general problem. These are:

McGushion U.S. Pat. Nos. 5,054,822 and 5,306,052

Robinson U.S. Pat. No. 5,829,796

In these patents, which show products that are in use today, the products relate to joining the seal-bearing heads of two manipulable lengths of tubing. None, however, attends to the common situation where one of the nuts and its associated head and face seal are not readily accessible for the use of a torque-resisting system.

An example is an outlet fitting on a bulkhead connectors, filters, mass flow controllers and some valves, in which the fitting, which is already fixed on the component or valve, is simply a male nut with a face seal on its end. Then, when the female nut is applied along with its associated face seal and gasket, rotation of the nut can cause limited rotation of the face seals, and can damage one or both of the seals.

It is an object of this invention to provide a retrofit attachment for the male nut which can separately be attached to an existing, already installed male nut that will provide torque-limiting blades which can be engaged by matching torque limiting blades pressed by the female nut against one of the heads, thereby preventing relative rotation of the face seals.

BRIEF DESCRIPTION OF THE INVENTION

A retrofit fitting according to this invention is intended to be threaded onto an already installed male nut, which male nut itself carries a face seal to be abutted and protected against rotational contact with an engaging gasket. A second face seal is pressed against the other side of the gasket by a threaded nut. The fitting also protects the face seals from contacting each other.

According to this invention, the retrofit fitting is a tubular adaptor threaded both internally and externally, and which carries a pair of torque-resisting blades. When the retrofit fitting is tightly threaded onto the male nut, it in effect becomes a non-rotating portion of the male nut, and provides torque-resisting blades.

A torque cage includes a complementary set of blades which engage the blades of the retrofit fitting. The female nut surrounds and turns against the cage as it drives it axially, but this torque is isolated from the second face seal by the blades so it cannot be turned.

This arrangement thereby provides an easily-applied retrofit fitting which enables the face seals on two heads to be restrained against relative rotation while the two nuts are threaded together.

The above and other features of this invention will be fully understood from the following detailed description and the accompanying drawings, in which:

BRIEF DESCRIPTION OF THE INVENTION

Figure 1:
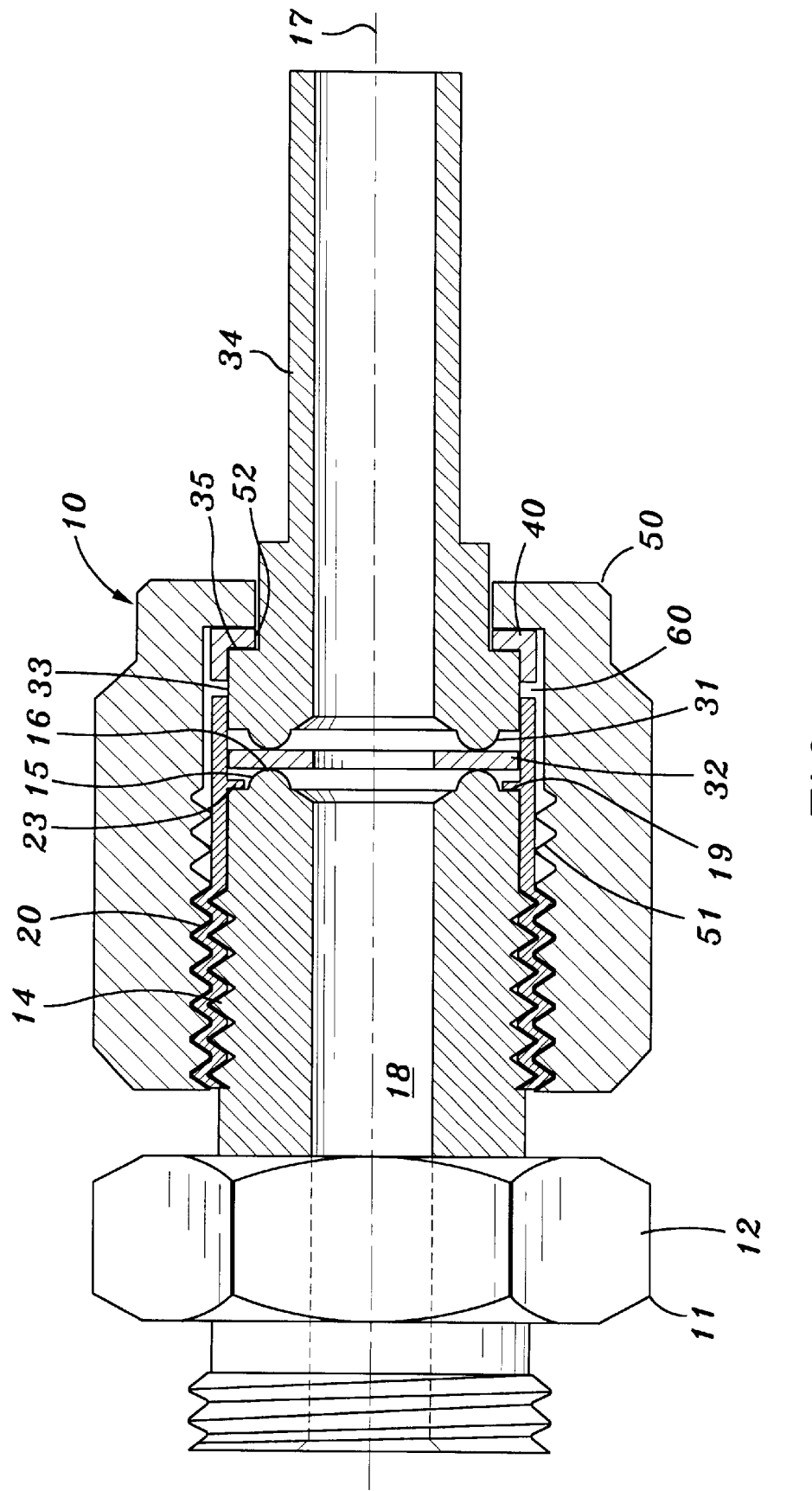
FIG. 1 is an axial cross-section of an assembly according to this invention.

FIG. 1 shows the assembly of a retrofit fitting 10 to an existing male nut 11. Nut 11 has wrench-engaging surfaces 12 which are used for installing the nut, and also for restraining it from being turned while the apparatus of this invention is being installed.

The male nut will be attached to a fixed unit such as a gas cabinet (not shown). A male thread 14 is formed on the male nut. In conventional systems, it would directly be engaged by a female nut. This invention provides for a different engagement.

A face seal 15 (FIG. 1) is formed on the male nut. It is a circular structure whose edge 16 lies in a theoretical plane normal to the central axis 17 of the male nut. The seal is formed as a circumferential bead which surrounds a central passage 18 through the nut, and communicates with the source of a gas to be conveyed and confined. A locator ledge 19 is placed on the male nut at a known axial spacing from face seal edge 16.

Figure 2:
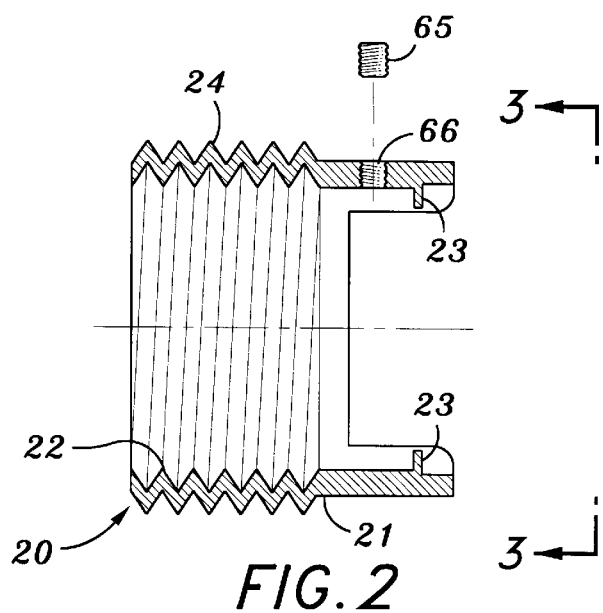
FIG. 2 is an axial cross-section of the adaptor.
Figure 3:
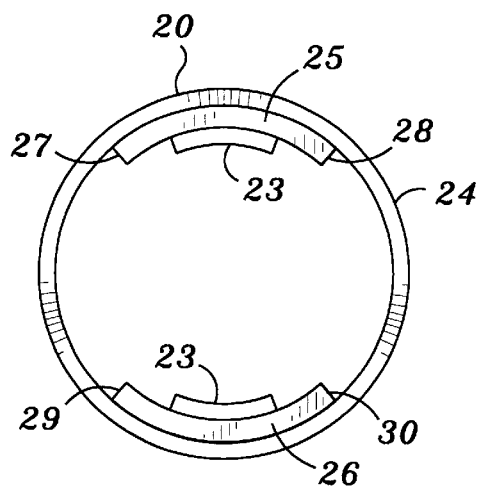
FIG. 3 is an end view taken at line 3—3 in FIG. 2.

According to this invention, retrofit fitting 20 (FIG. 2) comprises a circumferential adaptor 21 in the nature of a sleeve with an internal thread 22. Internal thread 22 is dimensioned to engage male thread 14. Fitting 20 can thereby be threaded down hard onto the male nut, in effect becoming a functional and fixed part of it. The adaptor is located by internal tabs 23 that contact the locator ledge 19. When the tabs 23 bear against ledge 19, the adaptor is on tight, and all dimensions relative to the face seal are established. An external thread 24 is formed in the outside of the adaptor.

A pair of blades 25, 26, each being axial fragments of a cylinder extend away from the threads. Each has two axially extending edges 27, 28, 29, 30 for a purpose yet to be described.

It will now be noted that these blades will not rotate relative to the male nut, and more particularly, not relative to face seal 15. This provides to the male nut the advantages of blades similar to those shown in the prior art, which could not fixedly be attached to an existing male nut except by means such as spot welds, and then not until after the male nut was already installed on something such as a gas cabinet.

After the installation of the adaptor, the remainder of the joinder can be completed in a routine manner. As best shown in FIG. 1, a gasket 32 is placed between face seal 15 and a second face seal 31, which is located on a head 33. Head 33 is formed on a tubing 34. Face seals 15 and 31 are identical and face toward each other, on opposite sides of the gasket. Head 33 has a compression flange 35 facing in the opposite direction from seal 31.

Figure 4:
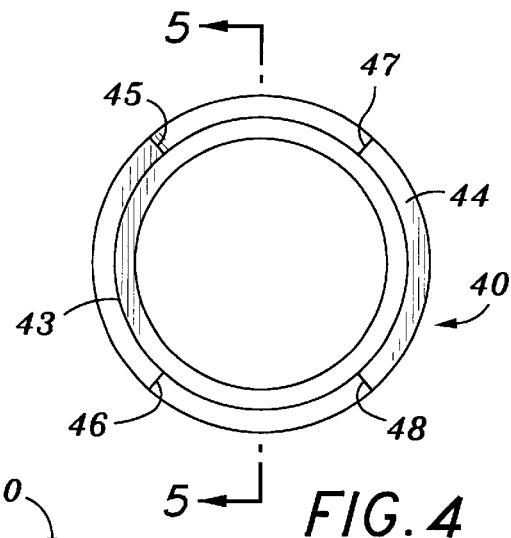
FIG. 4 is an end view of the torque case.
Figure 5:
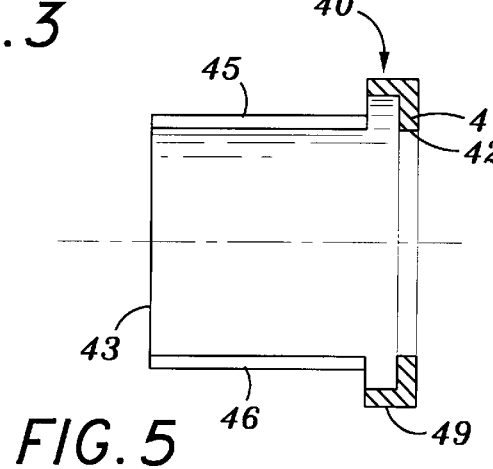
FIG. 5 is a cross-section taken at line 5—5 in FIG. 4.

A torque cage 40 (FIGS. 4 and 5) has a central flange 41 with a central port 42 through it to pass tubing 34, and a pair of axially extending blades 43, 44. These blades are similar to blades 25 and 26 with edges 45, 46, 47, 48 parallel to the axis. These blades will engage with the edges of the adaptor to enable axial movement that will prevent relative rotation between themselves and anything restrained to them. Notice that the blades extend from a circumferential collar 49 that rises from flange 41.

A female nut 50 has an internal thread 51 dimensioned to engage external thread 24 on the adaptor. It includes a compression shoulder 52 that bears against flange 41.

The resulting axial compression tightens the cage onto head 33, and drives seal 31 against the gasket. However, rotation of the female nut cannot turn the head because the blades are held against relative rotation by the adaptor. Thus, the seal faces cannot be rotated relative to one another. The reactive forces are entirely axial, and the faces are protected against being scarred by rotation relative to the gasket.

Direct contact of the two seals with each other is impermissible because of likely damage to their surfaces. Instead the gasket is placed between them so the face seals make contact with respective, opposite, sides of the gasket instead.

It is possible for an installer to forget to place a gasket between the two heads. Then if the heads could be driven together by tightening the female nut, the face seals could be damaged. To prevent this, the axial length of at least one of the blades relative to the axial length of an aligned collar on the other, will be such as to contact one another and stop the female nut from further compression before the face seals are pressed against each other. The thickness of the gasket is such that the face seals will have been forced against the gasket before the blade contacts the collar, leaving a spacing 60, thereby providing assurance that the device cannot be assembled without a gasket.

Tabs 23 are formed as an internal ledge around parts of the inside of the adaptor. Their face will be against the end of the male nut to locate the adaptor precisely relative to the head, especially as to the face seal, and their thickness is precisely known, so the torque cage will be stopped before the face seals can contact one another should the gasket be missing.

While the binding of the threads on the adaptor and on the male nut will usually provide ample tightness, it may occasionally be desired to provide a set screw 65 threaded into a port 66 in the adaptor to seat against the male nut and assure the tightness.

The simple adaptor-type fitting thereby provides to this class of joinder the advantages of the much more expensive prior art construction, which heretofore have not been attainable in an after market situation.

This invention is not to be limited by the embodiment shown in the drawings and described in the description, which is given by way of example and not of limitation, but only in accordance with the scope of the appended claims.

I claim:

1. A retrofit fitting to prevent relative rotation of a pair of axially aligned face seals, said face seals facing toward each other to make abutting contact with an intervening washer, one of said face seals being formed on an externally threaded male nut, the other face seal being formed on a head having a shoulder, said head being embraced by a torque cage having a lateral shoulder and a pair of blades, a female nut being so proportioned and arranged as to press said shoulder of said cage against said head, said retrofit fitting comprising:

a tubular adaptor comprising a tubular body having a central axis;

an axial internal thread inside said adaptor proportioned to engage the thread of the male nut;

an axial external thread on the outside of said adaptor proportioned to be engaged by the internal thread of the female nut; and a plurality of axially extending blades extending from said tubular body, said blades having axially extending edges so disposed and arranged as to engage respective blades on said torque cage, thereby preventing relative rotation between said blades on said adaptor and on said torque cage, and thus between said face seals.

2. A retrofit fitting according to claim 1 in which said blades are portions of respective axial cylinders.

3. A retrofit fitting according to claim 1 in which said adaptor includes an internal tab so disposed and arranged as to contact a ledge on said male nut to locate the adaptor on the nut.

4. A retrofit fitting according to claim 3 in which said adaptor includes a surface between its blades which will be abutted by said blade on said torque cage before said face seals can be pressed against one another.

5. A fluid sealing coupling for the outlet of a gas-containing structure, said coupling having an axis and comprising:

a male nut adapted to be threaded to said outlet, and having a male thread; a first face seal supported by said male nut, said face seal and nut being coaxial;

a fitting comprising a tubular adaptor having an axial internal thread and an axial external thread, and a plurality of axially extending blades having axially-extending edges laterally spaced from said axis, said internal thread being threaded onto said male thread;

a torque cage having a shoulder and a plurality of axially extending blades with edges laterally spaced from said axis engaging the edges of the blades on the fitting;

a female nut threaded onto the external thread of the fitting and pressing the torque cage toward said male nut;

and face seals respective to the male nut and female nut adapted to be pressed toward another to form a seal with a gasket between them when the nuts are fully tightened.

6. A coupling according to claim 5 in which said blades are portions of a respective axial cylinder.

7. A fluid sealing coupling according to claim 5 in which said adaptor includes an internal tab so disposed and arranged as to contact a ledge on said male nut to locate the adaptor on the nut.

8. A fluid sealing coupling according to claim 7 in which said adaptor includes a surface between its blades which will be abutted by said blade on said torque cage before said face seals can be pressed against one another.

* * * * *